United States Patent
Goldbach et al.

(10) Patent No.: US 11,114,845 B2
(45) Date of Patent: Sep. 7, 2021

(54) ADAPTER SYSTEM FOR IC AND TRANSIENT VOLTAGE CIRCUIT

(71) Applicant: Maxi Volt Corporation Inc., Amarillo, TX (US)

(72) Inventors: William Goldbach, Amarillo, TX (US); James Moellmann, Amarillo, TX (US); Mark Wingate, Amarillo, TX (US)

(*) Notice: Subject to any disclaimer, the term of this patent is extended or adjusted under 35 U.S.C. 154(b) by 648 days.

(21) Appl. No.: 15/868,999

(22) Filed: Jan. 11, 2018

(65) Prior Publication Data

US 2018/0198275 A1     Jul. 12, 2018

Related U.S. Application Data

(60) Provisional application No. 62/445,139, filed on Jan. 11, 2017.

(51) Int. Cl.
    *H02H 9/04*     (2006.01)
(52) U.S. Cl.
    CPC ............ *H02H 9/041* (2013.01); *H02H 9/042* (2013.01)
(58) Field of Classification Search
    CPC ................... H02H 9/04–045; H01R 13/6666
    See application file for complete search history.

(56) References Cited

U.S. PATENT DOCUMENTS

| | | | | |
|---|---|---|---|---|
| 4,616,286 A | * | 10/1986 | Breece | H03H 1/0007 361/111 |
| 6,380,862 B1 | * | 4/2002 | Karim | H02H 9/042 340/635 |
| 9,748,764 B2 | * | 8/2017 | Bandel | H02H 9/042 |
| 2012/0092835 A1 | * | 4/2012 | Miller | H01R 13/03 361/724 |
| 2014/0126092 A1 | * | 5/2014 | Alexander | H02H 9/041 361/56 |
| 2014/0313631 A1 | * | 10/2014 | Mickievicz | H05K 5/0286 361/118 |

* cited by examiner

*Primary Examiner* — Jared Fureman
*Assistant Examiner* — Christopher J Clark
(74) *Attorney, Agent, or Firm* — Shannon Warren (57) ABSTRACT

An adapter system for protection of electronics from voltage spikes induced on connected wires. Said adapter system comprises an enclosure, one or more power line connectors and a suppression elements. Two or more plug sockets comprise at least a first line socket and a neutral socket. Said first line socket connects to a first line. Said neutral socket connects to a neutral. Said adapter system is configured to connect to at least said first line with said one or more power line connectors and suppressing a portion of a power on said first line with said suppression elements.

18 Claims, 9 Drawing Sheets

ADAPTER SYSTEM FOR IC AND TRANSIENT VOLTAGE CIRCUIT

CROSS-REFERENCE TO RELATED APPLICATIONS

This application claims benefit to US Patent Application Nos. 62/445,139 filed on Jan. 11, 2017.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant
None of the known inventions and patents, taken either singularly or in combination, is seen to describe the instant disclosure as claimed.

BRIEF SUMMARY OF THE INVENTION

An adapter system for protection of electronics from voltage spikes induced on connected wires. Said adapter system comprises an enclosure, a power line connectors and a suppression elements. A plug sockets comprise at least a first line socket and a neutral socket. Said first line socket connects to a first line. Said neutral socket connects to a neutral. Said adapter system is configured to connect to at least said first line with said power line connectors and suppressing a portion of a power on said first line with said suppression elements.

An adapter system for protection of electronics from voltage spikes induced on connected wires. Said adapter system comprises an enclosure, a power line connectors and a suppression elements. A plug sockets comprise at least a first line socket and a neutral socket. Said first line socket connects to a first line. Said neutral socket connects to a neutral. Said adapter system is configured to connect to at least said first line with said power line connectors and suppressing a portion of a power on said first line with said suppression elements. Said suppression elements comprises one or more PCB headers each having one or more header connectors, one or more fuses, one or more varistors, one or more resistors, one or more diodes, one or more capacitors, an inductor, one or more switches, a K1, one or more buses. A portion of said suppression elements comprise a monitoring circuit. Said monitoring circuit is protected from other portions of said suppression elements with a diode bridge. Said one or more PCB headers comprise a first PCB header. Said first PCB header comprises a first header connector, a second header connector, and a third header connector. Said first PCB header comprises a first fuse between to said first header connector and a first suppression bus. The following components are arranged in parallel between a second suppression bus and a third suppression bus: a second resistor, a second varistor, a second diode and a second capacitor. The following components are arranged in parallel between said third suppression bus and said second suppression bus: a first resistor, a first varistor, a first diode and a first capacitor. Said second header connector attaches directly to said second suppression bus. A second fuse connects between said third header connector and said third suppression bus. The following components are arranged in series between said third suppression bus and a first terminal of a diode bridge: a third resistor and a third capacitor. A second terminal connects to a second monitoring bus. A fourth terminal connects to a first monitoring bus. A third terminal connects to said first suppression bus. The following components are arranged in parallel between said second monitoring bus and said first monitoring bus: a fourth capacitor, a fourth diode, a fourth resistor and said inductor. A fourth header connector 604d connects to the output of a first switch. A sixth header connector and a fifth header connector connect to the inputs of said first switch. An output of a second switch is connected to said second monitoring bus. The following components can be arranged in series between said first monitoring bus and a first input of said second switch: a fifth diode and a fifth resistor. Said K1 is attached to the second input of said second switch.

An adapter system for protection of electronics from voltage spikes induced on connected wires. Said adapter system comprises an enclosure, a power line connectors and a suppression elements. A plug sockets comprise at least a first line socket and a neutral socket. Said first line socket connects to a first line. Said neutral socket connects to a neutral. Said adapter system is configured to connect to at least said first line with said power line connectors and suppressing a portion of a power on said first line with said suppression elements. Said suppression elements comprises one or more PCB headers each having one or more header connectors, one or more fuses, one or more varistors, one or more resistors, one or more diodes, one or more capacitors, an inductor, one or more switches, a K1, isolated form C contacts and one or more buses. Said one or more buses comprise a first suppression bus, a second suppression bus, a third suppression bus, and a first monitoring bus. A portion of said suppression elements comprise a monitoring circuit. Said monitoring circuit is protected from other portions of said suppression elements with a diode bridge. Said one or more PCB headers comprise a first PCB header and a second PCB header. Said first PCB header comprises a first header connector, and a third header connector. A first fuse attaches between to said first header connector and said first suppression bus. The following components are arranged in parallel between said second suppression bus and said first suppression bus: a first resistor, a first varistor, a first diode, a second diode and a first capacitor. A second fuse connects between said third header connector and said second suppression bus. Said one or more diodes comprise a diode bridge. Said diode bridge comprises a diode bridge comprising a first terminal, a second terminal, a third terminal, and a fourth terminal. Said diode bridge is arranged between a portion of said suppression elements and a monitoring circuit protection configuration to protect monitoring components within said suppression elements. The following components are arranged in series between said second suppression bus and said first terminal of said diode bridge: a third resistor and a third capacitor. Said second terminal connects to a second monitoring bus. Said fourth terminal connects to said first monitoring bus. Said third terminal connects to said first suppression bus. The following components are arranged in parallel between said second monitoring bus and said first monitoring bus: a fourth capacitor, a fourth diode, a fourth resistor, said inductor and the combination of a sixth resistor and a fifth diode in series.

Said isolated form C contacts comprise said second PCB header with a first switch and a second switch. Said second PCB header comprises a fourth header connector, a fifth header connector and a sixth header connector. Said fourth header connector connects to the output of said first switch. Said sixth header connector and said fifth header connector connect to the inputs of said first switch. An output of said second switch is connected to said second monitoring bus. Said K1 is attached to the second input of said second switch. Said one or more varistors comprise zinc-oxide nonlinear resistors.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

These parts are illustrated in the figures and discussed below:
an adapter system 100
an enclosure 102
a plug sockets 104
a first plug sockets 104a
a second plug sockets 104b
an indicator 108
a top 202
a bottom 204
one or more sides 206
a first side 206a
a second side 206b
a front 208
a back 210
a bottom portion 212
a top portion 214
a first line socket 302
a second line socket 303
a neutral socket 304
a common alarm socket 306
a normally closed alarm socket 308
a normally open alarm socket 310
a first line 312
a second line 314
a neutral 316
a single phase configuration 318
a multi-phase configuration 320
a block diagram 500
a power line connectors 502
an indicator 506
a surge suppression elements 508
a suppression elements 510
a PCB 512
a first schematic 600
one or more PCB headers 602
a first PCB header 602a
a second PCB header 602b
one or more header connectors 604
a first header connector 604a
a second header connector 604b
a third header connector 604c
a fourth header connector 604d
a fifth header connector 604e
a sixth header connector 604f
one or more fuses 606
a first fuse 606a
a second fuse 606b
one or more varistors 608
a first varistor 608a
a second varistor 608b
one or more resistors 610
a first resistor 610a
a second resistor 610b
a third resistor 610c
a fourth resistor 610d
a fifth resistor 610e or 610f
one or more diodes 612
a first diode 612a
a second diode 612b
a diode bridge 612c
a fourth diode 612d
a fifth diode 612e
one or more capacitors 614
a first capacitor 614a
a second capacitor 614b
a third capacitor 614c
a fourth capacitor 614d
one or more terminals 616
a first terminal 616a
a second terminal 616b
a third terminal 616c a fourth terminal 616d
an inductor 618a
one or more switches 620
a first switch 620a
a second switch 620b
a K1 622
isolated form C contacts 624
a LED 626
one or more buses 628
a first suppression bus 628a
a second suppression bus 628b
a third suppression bus 628c
a first monitoring bus 628d
a second monitoring bus 628e
a monitoring circuit protection configuration 630
a second schematic 700
a voltage chart 800
a voltage axis 802
a current axis 804
a non-silicon voltage 806
a silicon voltage 808
a layer view 900
one or more layers 902
a first layer 902a
a second layer 902b
a di-electric shield 904
a multi-layer circuit board 906

Figure 1:
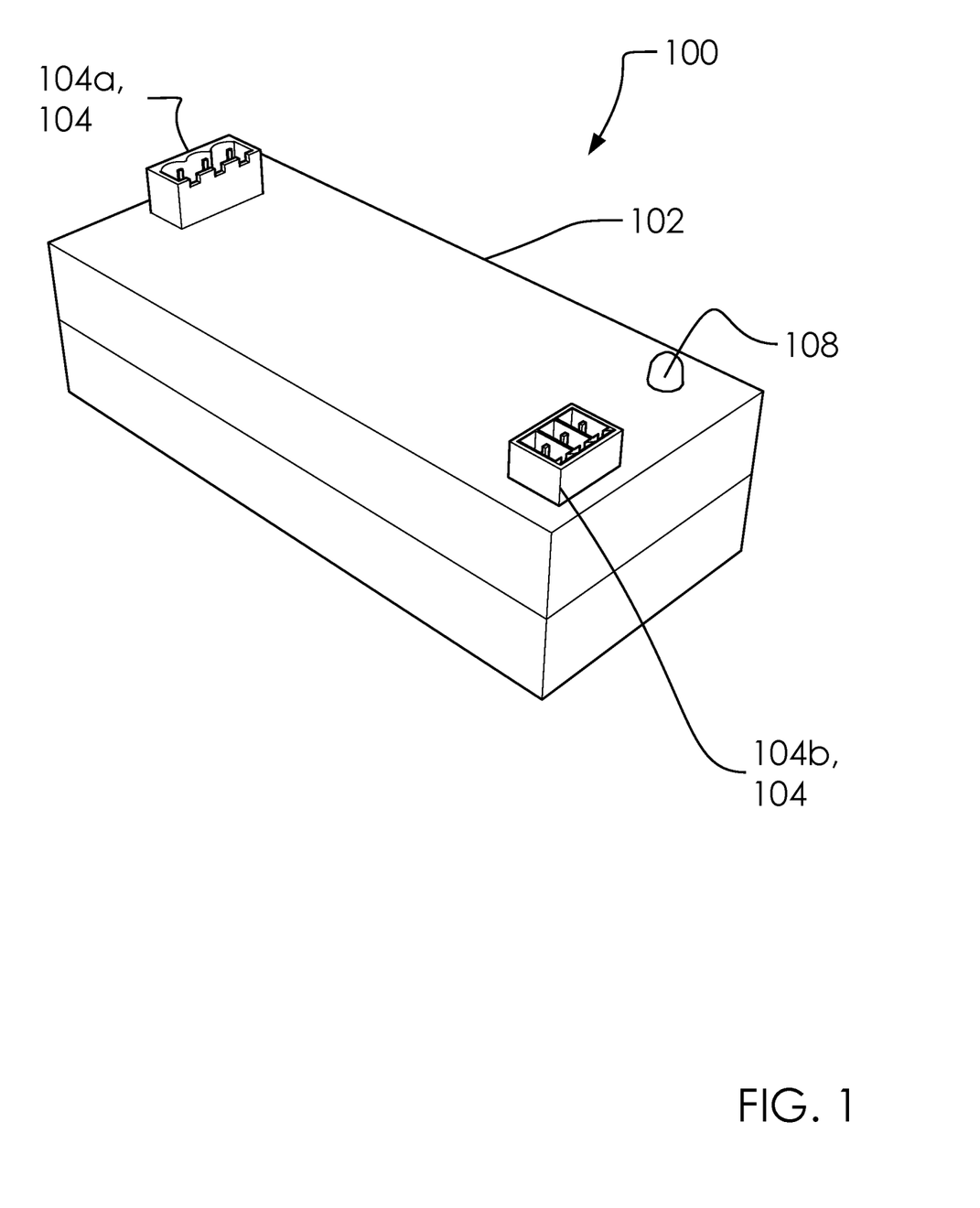
FIG. 1 illustrates a perspective overview of adapter system 100.

FIG. 1 illustrates a perspective overview of adapter system 100.

In one embodiment, said adapter system 100 can comprise said enclosure 102, said first plug sockets 104a, said second plug sockets 104b and said indicator 108.

In one embodiment, said plug sockets 104 can comprise said first plug sockets 104a and said second plug sockets 104b.

In one embodiment, said adapter system 100 can comprise a transient-voltage suppression system for protection of electronics from voltage spikes induced on connected wires.

Said adapter system 100 can comprise a system designed for sensitive individual circuit protection. Said adapter system 100 can comprise in many form factors including a DIN rail mountable 8-pin base which allows for ease of installation and hot-swappable replacement. Also available may be a series or parallel configuration which can safely take equipment offline or allow equipment to continue operating in the event the device becomes expended. Said adapter system 100 can comprise an alarm pin to be utilized for remote monitoring. Said adapter system 100 can comprise a hybrid circuit consisting of only the highest quality components engineered to provide industry best clamping threshold for specific applications. Said adapter system 100 can comprise safety fusing and non-ground dependent design, thereby eliminating safety risks associated with competitive devices.

Said enclosure 102 can comprise a nonconductive, corrosion resistant material.

Said adapter system 100 can comprise a new, smaller, size as compared to prior editions of said adapter system 100 by the Applicant. However, it is distinguished in more than just scale. A much smaller integrated circuit can detect phase loss and report a condition or state based on the detection. The prior art was designed for vectoring to accomplish monitoring.

In one embodiment, indicator 108 can comprise an LED light, as is known in the art. Said indicator 108 can remain green for normal operating conditions.

Figure 2A:
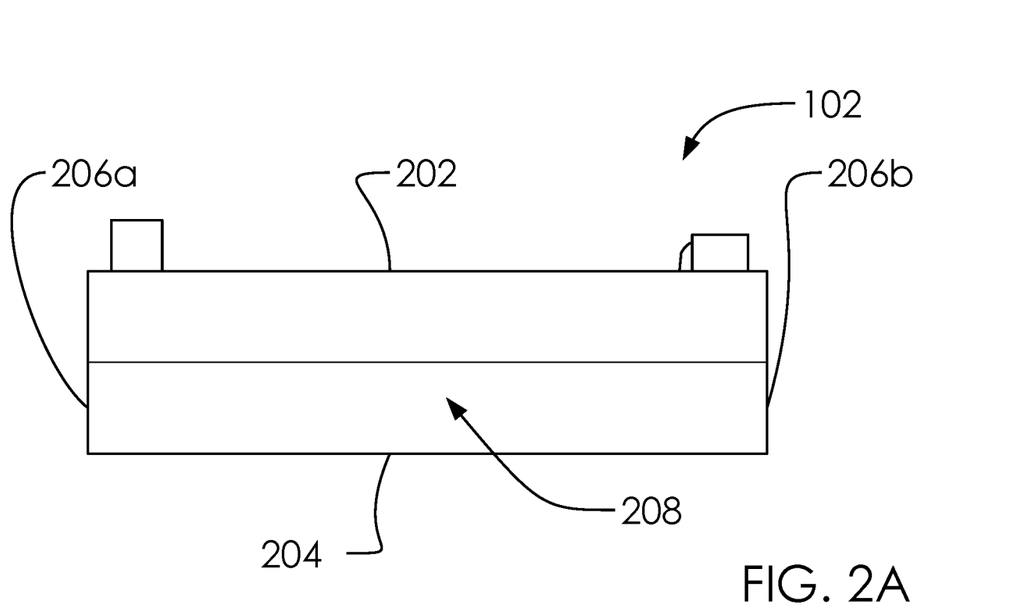
FIG. 2A illustrates elevated first side view of adapter system 100.

FIG. 2A illustrates elevated first side view of adapter system 100.

Figure 2B:
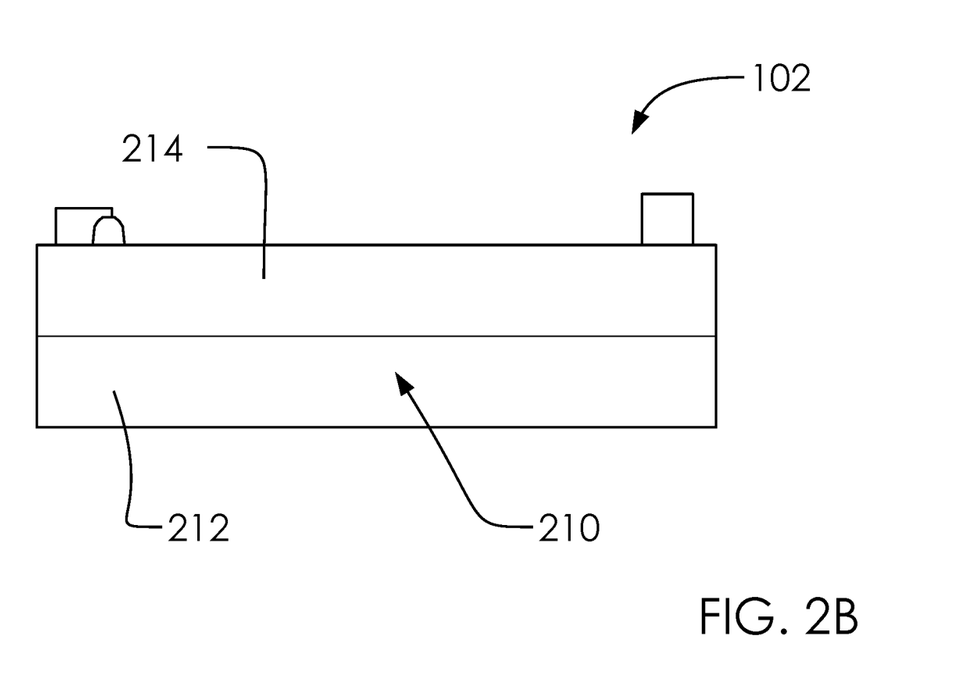
FIG. 2B illustrates elevated second side view of adapter system 100.

FIG. 2B illustrates elevated second side view of adapter system 100.

In one embodiment, said one or more sides 206 can comprise said first side 206a and said second side 206b.

In one embodiment, said adapter system 100 can comprise said top 202, said bottom 204, said one or more sides 206, said first side 206a, said second side 206b, said front 208 and said back 210.

In one embodiment, said enclosure 102 can comprise a shell containing one or more components and can maintain safety of said adapter system 100 in varying environmental conditions.

Said enclosure 102 can comprise said bottom portion 212 and said top portion 214 which can be opened, as is known in the art.

In one embodiment, said enclosure 102 can comprise a rectangular shape, but the shape and size of said adapter system 100 may vary according to design requirements and manufacturing advancement during a service life of the current disclosure.

Figure 3A:
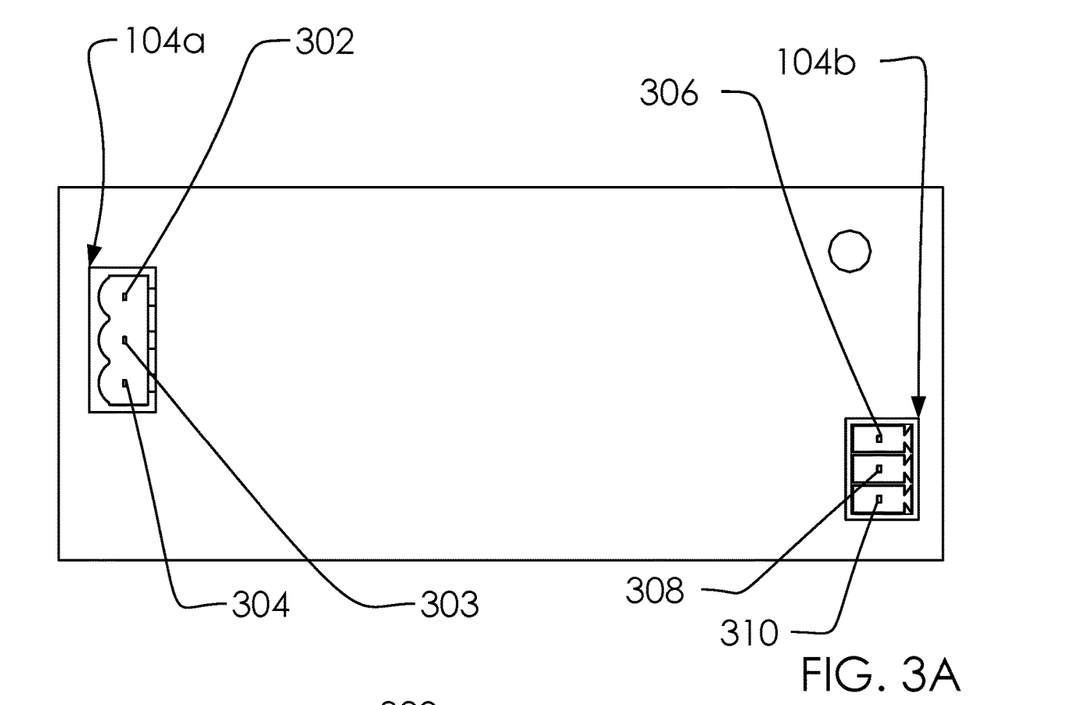
FIG. 3A illustrates elevated top view of adapter system 100.

FIG. 3A illustrates elevated top view of adapter system 100.

Figure 3B:
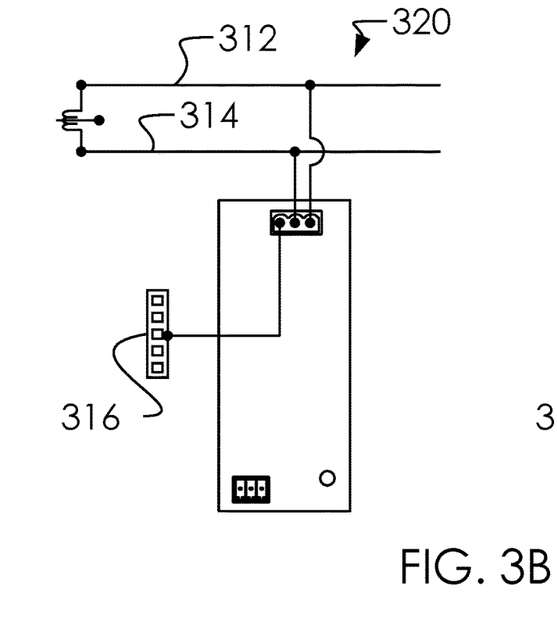
FIG. 3B illustrates an elevated top side view of adapter system 100 in a multi-phase configuration 320.

FIG. 3B illustrates an elevated top side view of adapter system 100 in a single phase configuration 318.

Figure 3C:
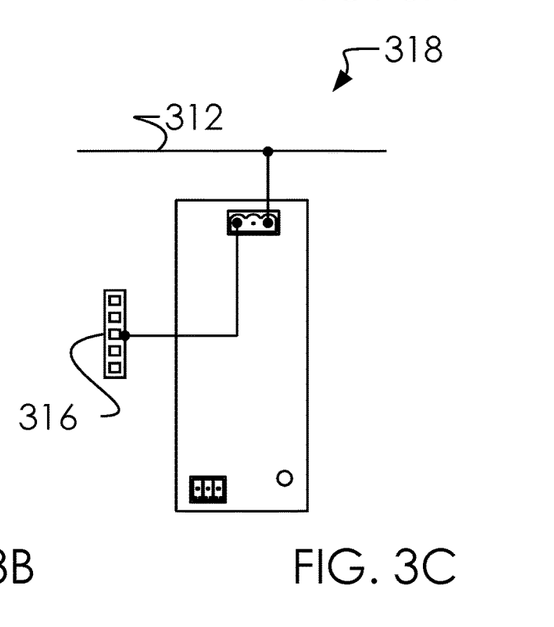
FIG. 3C illustrates an elevated top side view of adapter system 100 in a single phase configuration 318.

FIG. 3C illustrates an elevated top side view of adapter system 100 in a multi-phase configuration 320.

In one embodiment, said adapter system 100 can comprise said single phase configuration 318 and said multi-phase configuration 320.

In one embodiment, said first plug sockets 104a can comprise said first line socket 302, said second line socket 303 and said neutral socket 304.

In one embodiment, said second plug sockets 104b can comprise said common alarm socket 306, said normally closed alarm socket 308 and said normally open alarm socket 310.

Said first line socket 302 can comprise to a power line at a variety of voltages. Current configurations include 120/240 VAC (split phase), 120 VAC, 240 VAC, and 277 VAC. Said adapter system 100 would be useful in other industries as well, such as photovoltaic where voltages can reach as high as 1200 VAC. Further, adapter system 100 is suitable for use on 300 VAC power systems, such as those in Europe.

For split phase protection, said second line socket 303 is employed to connect to a second line. In one embodiment, first plug sockets 104a can be rearranged with neutral socket 304 between first line socket 302 and second line socket 303.

In one embodiment, said second plug sockets 104b can communicate a status of said adapter system 100 to other systems, such as monitoring systems, as is known in the art.

Said single phase configuration 318 can comprise split phase with two phases such as 120 VAC and 240 VAC.

Figure 4A:
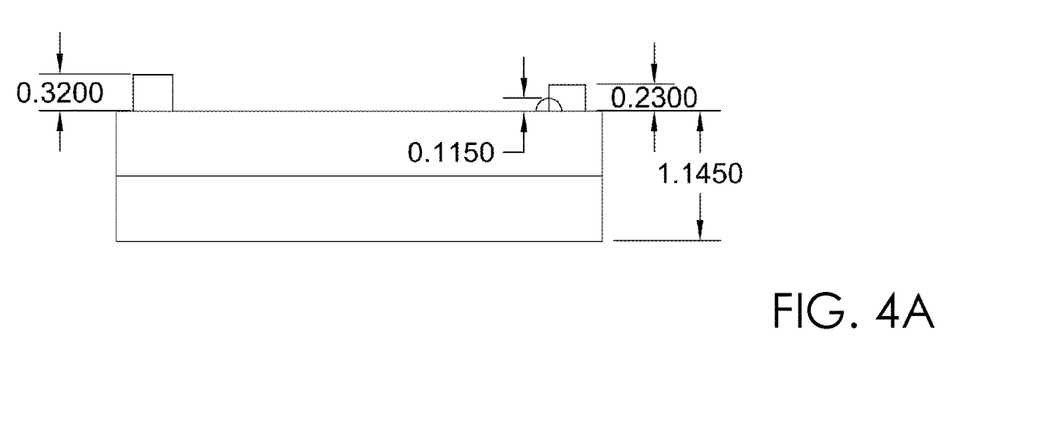
FIG. 4A illustrates elevated side view of adapter system 100.

FIG. 4A illustrates elevated side view of adapter system 100.

Figure 4B:
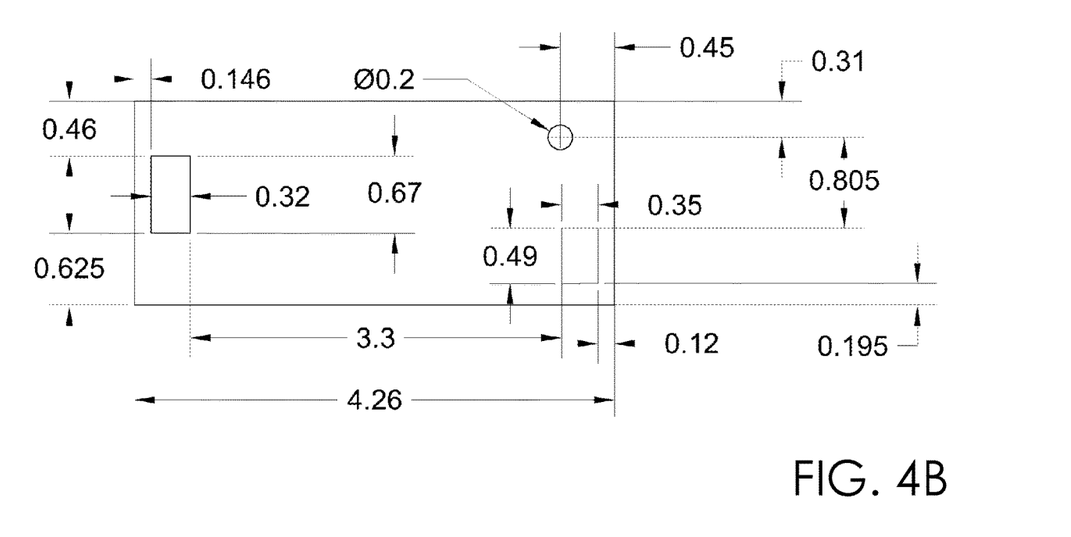
FIG. 4B illustrates elevated top view of adapter system 100.

FIG. 4B illustrates elevated top view of adapter system 100.

Provided herein are a preferred embodiment for said adapter system 100. Applicant, additionally, claims use of various changes to these dimensions as are entitled to him under USPTO and US laws and regulations.

Figure 5:
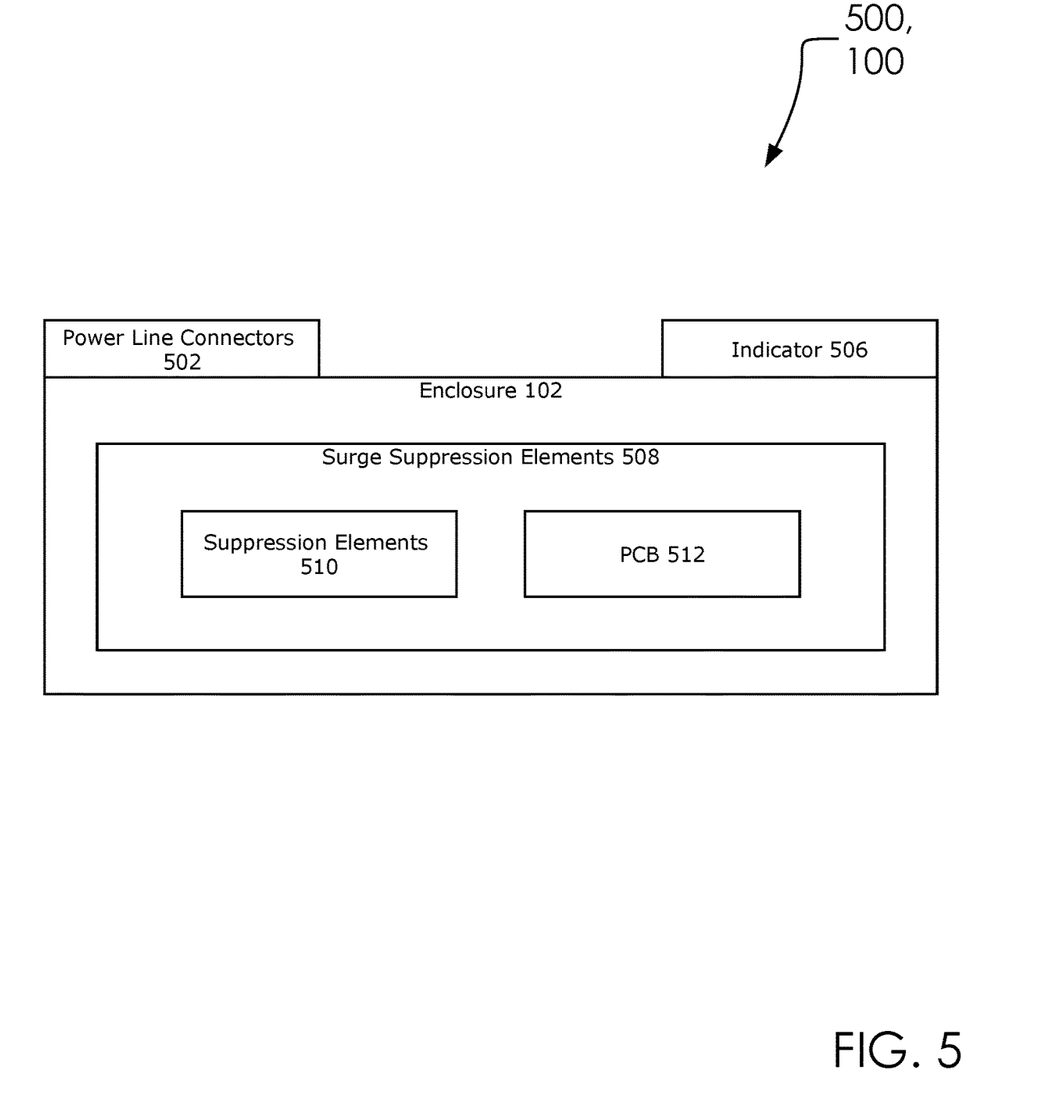
FIG. 5 illustrates block diagram 500.

FIG. 5 illustrates block diagram 500.

In one embodiment, said surge suppression elements 508 can comprise said suppression elements 510 and said PCB 512.

In one embodiment, said block diagram 500 can comprise said power line connectors 502, said indicator 506, said surge suppression elements 508, said suppression elements 510 and said PCB 512.

In one embodiment, said adapter system 100 can comprise said power line connectors 502 and said surge suppression elements 508.

Said block diagram 500 can comprise a diagram of components in said adapter system 100.

Said enclosure 102 can protect said surge suppression elements 508 from environmental damage.

Said power line connectors 502 can each comprise parts of a plug having a plurality of pins for passing signals and power into and out of said adapter system 100. Said indicator 506 can further comprise an LED indicator, such as said indicator 108.

In one embodiment, said suppression elements 510 can be controlled by said PCB 512, as illustrated herein.

Said PCB 512 can create safety signals to be sent to said indicator 506 and/or second plug sockets 104b.

Said power line connectors 502 can be fed into said surge suppression elements 508, tested and filtered with said suppression elements 510 and said PCB 512 and output through said power line connectors 502.

Here, said adapter system 100 is well adapted to industries with inconsistent power conditions and expensive equipment, such as heavy industry or HVAC systems. Said adapter system 100 is automated and protects expensive equipment without human intervention. Wherein, if said adapter system 100 fails, equipment can simply shut down rather than have a voltage spike.

Said suppression elements 510 can protect said PCB 512. Said surge suppression elements 508 can be reverse biased to protect both sides.

Generally, systems with integrated circuits can attract voltage spikes, thus, said suppression elements 510 can protect said PCB 512, as designed and disclosed.

In one embodiment, said PCB 512 can send a signal through said indicator 506 to a controller which can improve reliability and safety which can lead to a higher ROI.

In one embodiment, said adapter system 100 can comprise a hot-swappable element for panel integration. In one embodiment, it can comprise a wiring harness using headers for plug and play characteristics.

Said adapter system 100 can further comprise redundant suppression, advanced multilayer circuits, ground independent technology, and smart monitoring functionality. Further, said adapter system 100 can comprise a hybrid circuit, voltage suppression, and turnkey phase monitoring, filter, low claiming TVSS, fusing and communication.

Figure 6:
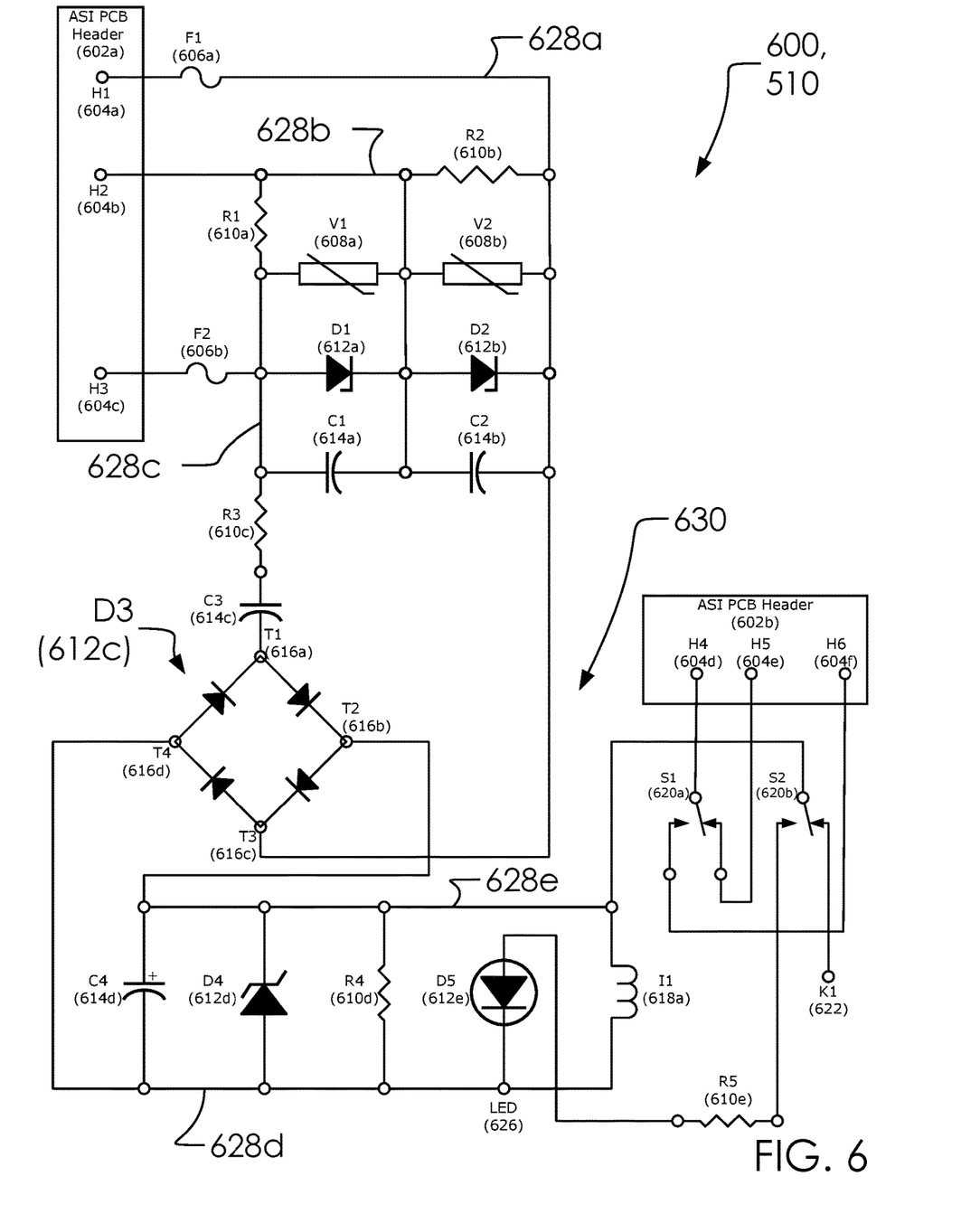
FIG. 6 illustrates first schematic 600 of suppression elements 510.

FIG. 6 illustrates first schematic 600 of suppression elements 510.

In one embodiment, said one or more PCB headers 602 can comprise said first PCB header 602a and said second PCB header 602b.

In one embodiment, said first PCB header 602a can comprise said second PCB header 602b and said one or more header connectors 604.

In one embodiment, said one or more header connectors 604 can comprise said first header connector 604a, said second header connector 604b and said third header connector 604c.

In one embodiment, said one or more fuses 606 can comprise said first fuse 606a and said second fuse 606b.

In one embodiment, said one or more varistors 608 can comprise said first varistor 608a and said second varistor 608b.

In one embodiment, said one or more resistors 610 can comprise said first resistor 610a, said second resistor 610b, said third resistor 610c, said fourth resistor 610d, and said fifth resistor 610e.

In one embodiment, said one or more diodes 612 can comprise said first diode 612a, said second diode 612b, said diode bridge 612c, said fourth diode 612d and said fifth diode 612e.

In one embodiment, said diode bridge 612c can comprise said one or more terminals 616.

In one embodiment, said one or more capacitors 614 can comprise said first capacitor 614a, said second capacitor 614b, said third capacitor 614c and said fourth capacitor 614d.

In one embodiment, said one or more terminals 616 can comprise said first terminal 616a, said second terminal 616b, said third terminal 616c and said fourth terminal 616d.

In one embodiment, said one or more switches 620 can comprise said first switch 620a and said second switch 620b.

In one embodiment, said one or more buses 628 can comprise said first suppression bus 628a, said second suppression bus 628b, said third suppression bus 628c, said first monitoring bus 628d, and said second monitoring bus 628e.

In one embodiment, said suppression elements 510 can comprise said one or more PCB headers 602, said third header connector 604c, said one or more fuses 606, said second fuse 606b, said one or more varistors 608, said second varistor 608b, said one or more resistors 610, said sixth resistor 610e, said one or more diodes 612, said one or more capacitors 614, said inductor 618a, said K1 622, said isolated form C contacts 624 comprising one or more switches 620, said LED 626, said one or more buses 628 and said monitoring circuit protection configuration 630.

Said suppression elements 510 can comprise a design, as illustrated herein.

Said adapter system 100 can comprise sinewave correction to filter and protect equipment.

In one embodiment, first PCB header 602a can comprise first fuse 606a between to first header connector 604a and first suppression bus 628a. The following components can be arranged in parallel between second suppression bus 628b and third suppression bus 628c: second resistor 610b, second varistor 608b, second diode 612b and second capacitor 614b. The following components can be arranged in parallel between third suppression bus 628c and second suppression bus 628b: first resistor 610a, first varistor 608a, first diode 612a and first capacitor 614a. Said second header connector 604b can attach directly to second suppression bus 628b. Said second fuse 606b can connect between third header connector 604c and third suppression bus 628c. These components can be arranged in series between third suppression bus 628c and first terminal 616a of diode bridge 612c: third resistor 610c and third capacitor 614c. Said second terminal 616b can connect to second monitoring bus 628e. Said fourth terminal 616d can connect to first monitoring bus 628d. Said third terminal 616c can connect to said first suppression bus 628a.

The following components can be arranged in parallel between second monitoring bus 628e and first monitoring bus 628d: fourth capacitor 614d, fourth diode 612d, fourth resistor 610d and inductor 618a.

Said fourth header connector 604d can connect to the output of first switch 620a. Said sixth header connector 604f and said fifth header connector 604e can connect to the inputs of said first switch 620a.

An output of second switch 620b can be connected to said second monitoring bus 628e. The following components can be arranged in series between said first monitoring bus 628*d* and a first input of said second switch 620*b*: fifth diode 612*e* and fifth resistor 610*e*. Said K1 622 can be attached to the second input of second switch 620*b*.

Figure 7:
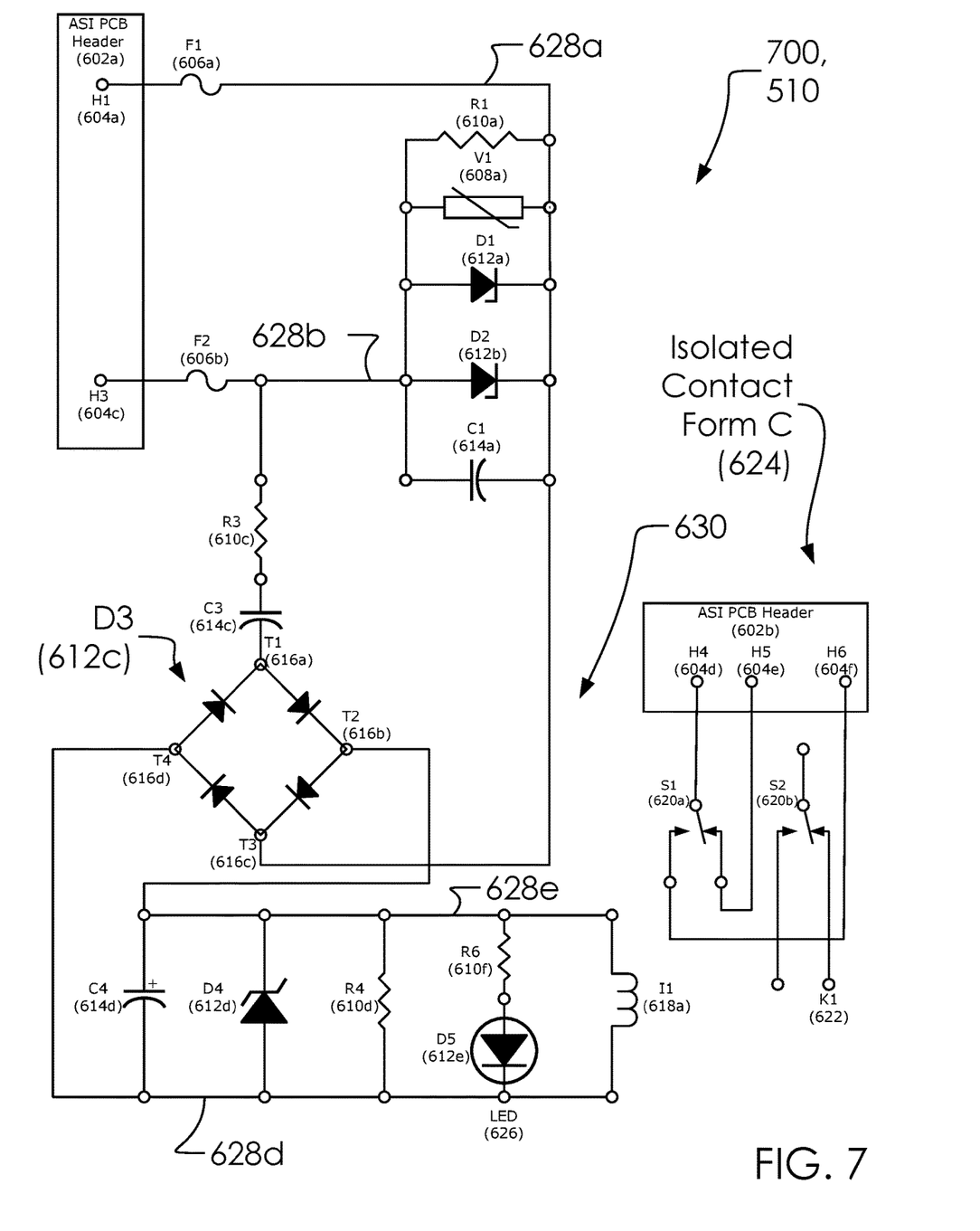
FIG. 7 illustrates second schematic 700 of suppression elements 510.

FIG. 7 illustrates second schematic 700 of suppression elements 510.

Said suppression elements 510 can comprise a design, as illustrated herein.

One advantage of said adapter system 100 can comprise a limitation of phase loss.

In one embodiment, said suppression elements 510 can be ground independent which increases resistance to lightning risk.

In one embodiment, said adapter system 100 can use varistors such as a zinc-oxide nonlinear resistor.

Said suppression elements 510 can comprise a means of protecting equipment during a phase loss. For example, with 3 phase input at said power line connectors 502 and a phase is lost, said adapter system 100 can cause a shut down of equipment rather than having it become damaged.

As illustrated, said second schematic 700 can comprise a configuration of said suppression elements 510 with said isolated form C contacts 624, as discussed to follow.

In one embodiment, first PCB header 602*a* can comprise first fuse 606*a* between to first header connector 604*a* and first suppression bus 628*a*. The following components can be arranged in parallel between second suppression bus 628*b* and first suppression bus 628*a*: first resistor 610*a*, first varistor 608*a*, first diode 612*a*, second diode 612*b* and first capacitor 614*a*.

Said second fuse 606*b* can connect between third header connector 604*c* and second suppression bus 628*b*. These components can be arranged in series between second suppression bus 628*b* and first terminal 616*a* of diode bridge 612*c*: third resistor 610*c* and third capacitor 614*c*. Said second terminal 616*b* can connect to second monitoring bus 628*e*. Said fourth terminal 616*d* can connect to first monitoring bus 628*d*. Said third terminal 616*c* can connect to said first suppression bus 628*a*.

The following components can be arranged in parallel between second monitoring bus 628*e* and first monitoring bus 628*d*: fourth capacitor 614*d*, fourth diode 612*d*, fourth resistor 610*d*, inductor 618*a* and the combination of said sixth resistor 610*f* and fifth diode 612*e* in series.

Said isolated contact form C 624 can comprise said second PCB header 602*b*, first switch 620*a* and second switch 620*b* isolated from said second monitoring bus 628*e* and first monitoring bus 628*d*. Wherein, said fourth header connector 604*d* can connect to the output of first switch 620*a*. Said sixth header connector 604*f* and said fifth header connector 604*e* can connect to the inputs of said first switch 620*a*.

Said K1 622 can be attached to the second input of second switch 620*b*.

Figure 8:
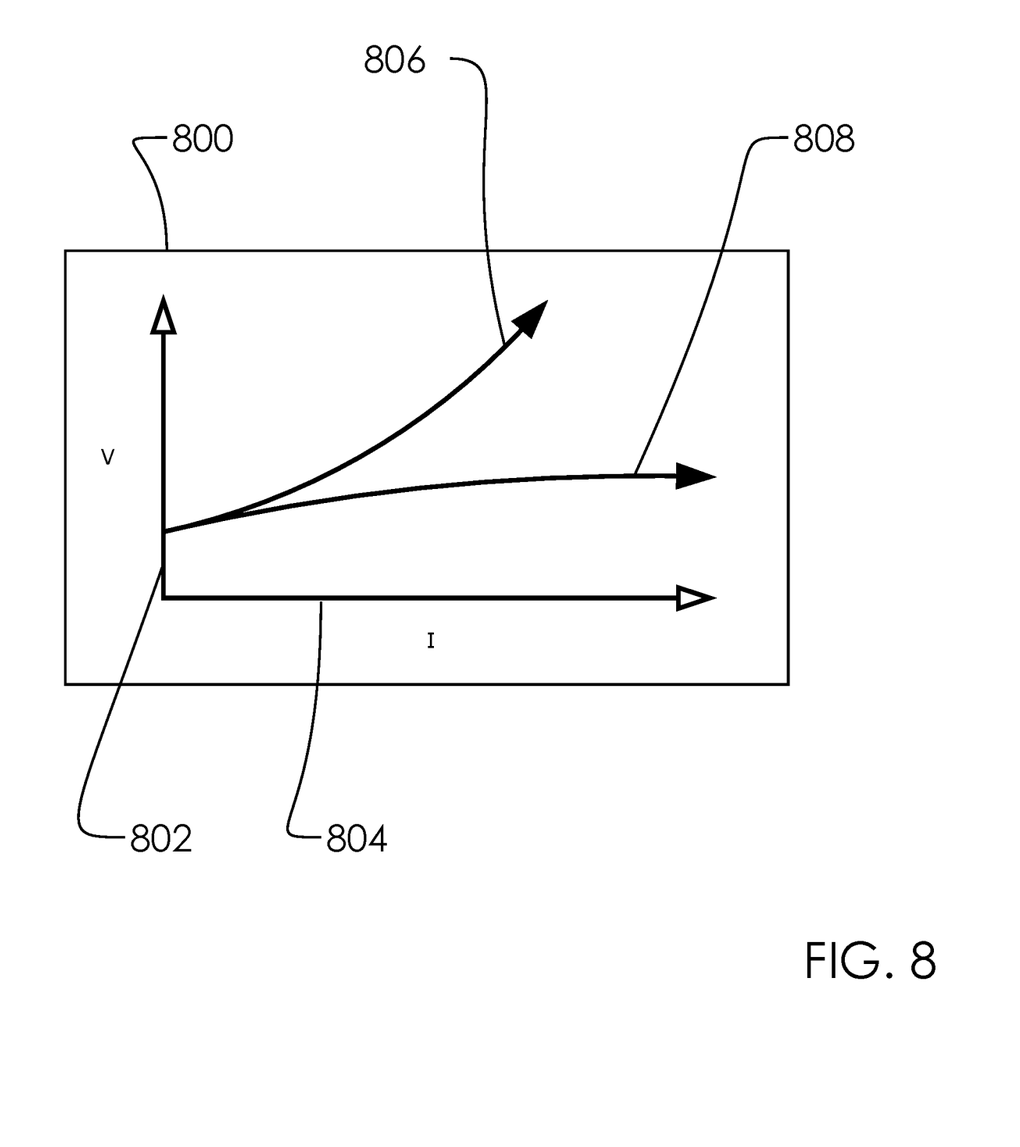
FIG. 8 illustrates voltage chart 800.

FIG. 8 illustrates voltage chart 800.

In one embodiment, said voltage chart 800 can comprise said voltage axis 802, said current axis 804, said non-silicon voltage 806 and said silicon voltage 808.

Said voltage chart 800 can comprise a comparison of said non-silicon voltage 806 and said silicon voltage 808.

By manufacturing said surge suppression elements 508 with said a fused silicon, said adapter system 100 can be improved to limit spikes in voltage with increased current. As illustrated, silicon keeps voltage flat which can protect equipment and prevent explosions.

Said adapter system 100 can be useful in other industries, such as marine, provided that said enclosure 102 can be custom produced for each application. For example, each vessel in yacht manufacturing may have a different form-factors for said enclosure 102 but use substantially the same internal components. A 3D printer can be used to custom make said enclosure 102 for each application. Many yachts are 2 phase electricity, which need to be filtered with said adapter system 100.

Figure 9:
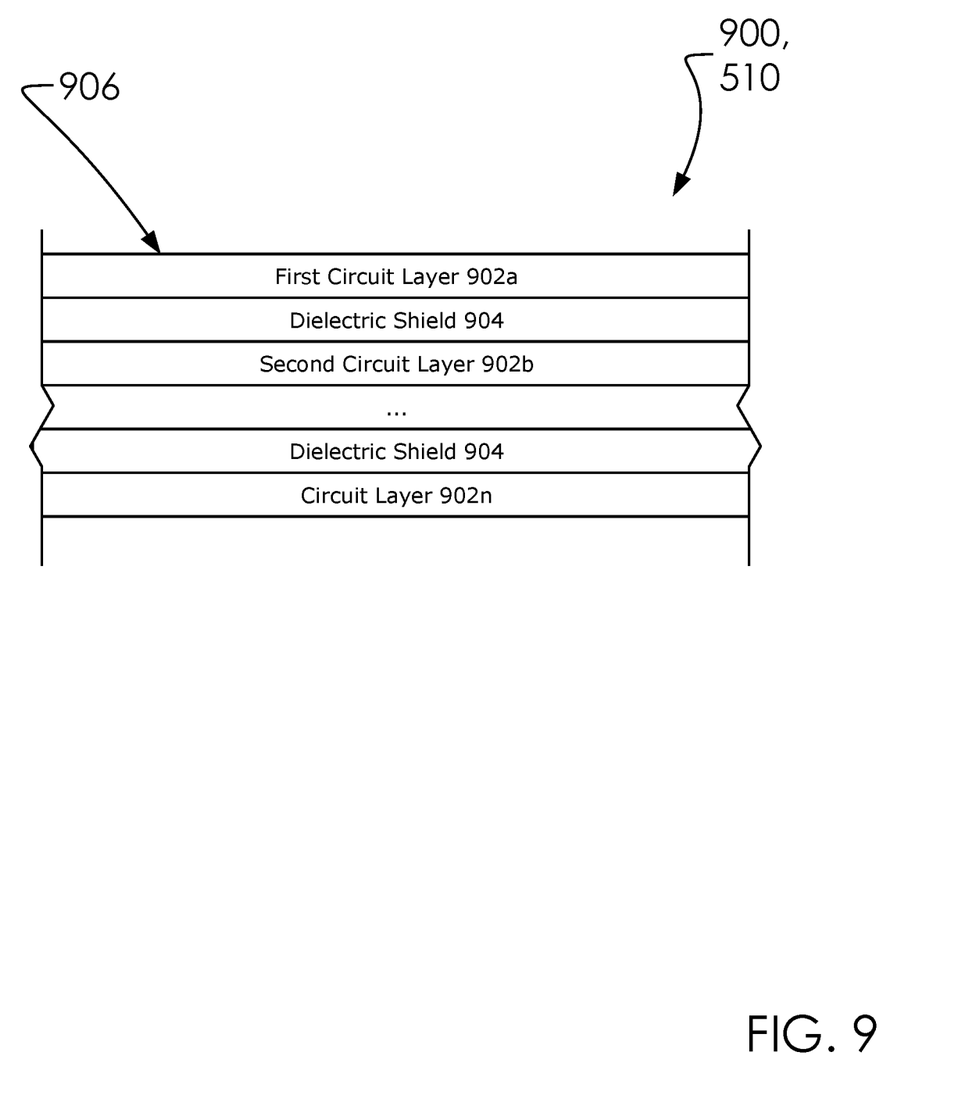
FIG. 9 illustrates layer view 900.

FIG. 9 illustrates layer view 900.

In one embodiment, said one or more layers 902 can comprise said first layer 902*a* and said second layer 902*b*.

In one embodiment, said adapter system 100 can comprise said multi-layer circuit board 906.

In one embodiment, said surge suppression elements 508 can comprise said one or more layers 902 and said di-electric shield 904.

In one embodiment, said suppression elements 510 can comprise said di-electric shield 904 and said di-electric shield 904.

In one embodiment, said suppression elements 510 can be created with a multilayer circuit, as illustrated. Also known as a 3D circuit board, this design has not been used in this field.

Said di-electric shield 904 is helpful for spacing said one or more layers 902 and shield said di-electric shield 904.

In one embodiment, adapter system 100 can comprise di-electric shield 904 between first layer 902*a* and second layer 902*b*; wherein, power components among suppression elements 510 can be embedded into first layer 902*a* and neutral or common components among said suppression elements 510 can be located on second layer 902*b*

The following sentences are included for completeness of this disclosure with reference to the claims.

An adapter system 100 for protection of electronics from voltage spikes induced on connected wires. Said adapter system 100 comprises an enclosure 102, a power line connectors 502 and a suppression elements 510. A plug sockets 104 comprise at least a first line socket 302 and a neutral socket 304. Said first line socket 302 connects to a first line 312. Said neutral socket 304 connects to a neutral 316. Said adapter system 100 is configured to connect to at least said first line 312 with said power line connectors 502 and suppressing a portion of a power on said first line 312 with said suppression elements 510.

Said suppression elements 510 comprise one or more PCB headers 602 having one or more header connectors 604, one or more fuses 606, one or more varistors 608, one or more resistors 610, one or more diodes 612, one or more capacitors 614, an inductor 618*a*, a K1 622, isolated form C contacts 624 comprising one or more switches 620 and one or more buses 628. Said one or more buses 628 comprise a first suppression bus 628*a*, a second suppression bus 628*b*, a third suppression bus 628*c*, and a first monitoring bus 628*d*. A portion of said suppression elements 510 comprise a monitoring circuit. Said monitoring circuit is protected from other portions of said suppression elements 510 with a diode bridge. Said one or more PCB headers 602 comprise a first PCB header 602*a* and a second PCB header 602*b*. Said first PCB header 602*a* comprises a first header connector 604*a*, and a third header connector 604*c*. A first fuse 606*a* attaches between said first header connector 604*a* and said first suppression bus 628*a*. The following components are arranged in parallel between said second suppression bus 628*b* and said first suppression bus 628*a*: a first resistor 610*a*, a first varistor 608*a*, a first diode 612*a*, a second diode 612*b* and a first capacitor 614*a*. A second fuse 606*b* connects between said third header connector 604*c* and said second suppression bus 628*b*. Said one or more diodes 612 comprise a diode bridge 612c. Said diode bridge 612c comprises a first terminal 616a, a second terminal 616b, a third terminal 616c, and a fourth terminal 616d. Said diode bridge 612c is arranged between a portion of said suppression elements 510 and a monitoring circuit protection configuration 630 to protect monitoring components within said suppression elements 510. The following components are arranged in series between said second suppression bus 628b and said first terminal 616a of said diode bridge 612c: a third resistor 610c and a third capacitor 614c. Said second terminal 616b connects to a second monitoring bus 628e. Said fourth terminal 616d connects to said first monitoring bus 628d. Said third terminal 616c connects to said first suppression bus 628a. The following components are arranged in parallel between said second monitoring bus 628e and said first monitoring bus 628d: a fourth capacitor 614d, a fourth diode 612d, a fourth resistor 610d, said inductor 618a and the combination of a sixth resistor 610e and a fifth diode 612e in series. Said isolated form C contacts 624 comprises said second PCB header 602b with a first switch 620a and a second switch 620b. Said second PCB header 602b comprises a fourth header connector 604d, a fifth header connector 604e and a sixth header connector 604f. Said fourth header connector 604d connects to the output of said first switch 620a. Said sixth header connector 604f and said fifth header connector 604e connect to the inputs of said first switch 620a. An output of said second switch 620b is connected to said second monitoring bus 628e. Said K1 622 is attached to the second input of said second switch 620b.

Said adapter system 100 comprises a multi-layer circuit board 906 embedded with portions of said suppression elements 510 and a PCB 512. Said multi-layer circuit board 906 comprises a di-electric shield 904, a first layer 902a and a second layer 902b. Said di-electric shield 904 is configured between said first layer 902a and said second layer 902b. Wherein, power components among said suppression elements 510 are embedded into said first layer 902a and neutral or common components among said suppression elements 510 are located on said second layer 902b.

Said one or more varistors 608 comprise zinc-oxide nonlinear resistors.

Said adapter system 100 comprises a hot-swappable element for panel integration. Said adapter system 100 comprises a wiring harness using headers for plug and play characteristics.

if said adapter system 100 fails, equipment attached to said adapter system 100 can simply shut down rather than have a voltage spike. Said suppression elements 510 is configured to protect a PCB 512.

Said adapter system 100 comprises a single phase configuration 318 and a multi-phase configuration 320. Said single phase configuration 318 comprises said first line 312 attached to a portion of said plug sockets 104 and said neutral socket 304 attached to said neutral 316. Said multi-phase configuration 320 comprises said first line 312 and a second line 314 each connected to one of said first line socket 302 and a second line socket 303, said first line 312 and said second line 314 are attached to different sockets from one another, said neutral socket 304 attached to said neutral 316. Said adapter system 100 is configured to accommodate different phase voltages as between said first line 312 and said second line 314 with said adapter system 100 in said multi-phase configuration 320.

Said adapter system 100 further comprises an indicator 108 comprising an LED light. Said indicator 108 is configured to indicate a status of said adapter system 100.

Said adapter system 100 comprises safety fusing and non-ground dependent design. Said enclosure 102 comprises a nonconductive, corrosion resistant material.

Said plug sockets 104 further comprise a second plug sockets 104b. Said second plug sockets 104b is configured to communicate a status of said adapter system 100 to other systems, such as monitoring systems.

Said second plug sockets 104b comprise a common alarm socket 306, a normally closed alarm socket 308 and a normally open alarm socket 310.

Said enclosure 102 is configured to protect and enclose said suppression elements 510.

Said enclosure 102 comprises DIN rail mountable 8-pin base.

Said suppression elements 510 comprises one or more PCB headers 602 having one or more header connectors 604, one or more fuses 606, one or more varistors 608, one or more resistors 610, one or more diodes 612, one or more capacitors 614, an inductor 618a, one or more switches 620, a K1 622, one or more buses 628. A portion of said suppression elements 510 comprise a monitoring circuit. Said monitoring circuit is protected from other portions of said suppression elements 510 with a diode bridge. Said one or more PCB headers 602 comprise a first PCB header 602a. Said first PCB header 602a comprises a first header connector 604a, a second header connector 604b, and a third header connector 604c. Said first PCB header 602a comprises a first fuse 606a between to said first header connector 604a and a first suppression bus 628a. The following components are arranged in parallel between a second suppression bus 628b and a third suppression bus 628c: a second resistor 610b, a second varistor 608b, a second diode 612b and a second capacitor 614b. The following components are arranged in parallel between said third suppression bus 628c and said second suppression bus 628b: a first resistor 610a, a first varistor 608a, a first diode 612a and a first capacitor 614a. Said second header connector 604b attaches directly to said second suppression bus 628b. A second fuse 606b connects between said third header connector 604c and said third suppression bus 628c. The following components are arranged in series between said third suppression bus 628c and a first terminal 616a of a diode bridge 612c: a third resistor 610c and a third capacitor 614c. A second terminal 616b connects to a second monitoring bus 628e. A fourth terminal 616d connects to a first monitoring bus 628d. A third terminal 616c connects to said first suppression bus 628a. The following components are arranged in parallel between said second monitoring bus 628e and said first monitoring bus 628d: a fourth capacitor 614d, a fourth diode 612d, a fourth resistor 610d and said inductor 618a. A fourth header connector 604d connects to the output of a first switch 620a. A sixth header connector 604f and a fifth header connector 604e connect to the inputs of said first switch 620a. An output of a second switch 620b is connected to said second monitoring bus 628e. The following components can be arranged in series between said first monitoring bus 628d and a first input of said second switch 620b: a fifth diode 612e and a fifth resistor 610e. Said K1 622 is attached to the second input of said second switch 620b.

Said adapter system 100 comprises a multi-layer circuit board 906 embedded with portions of said suppression elements 510 and a PCB 512. Said multi-layer circuit board 906 comprises a di-electric shield 904, a first layer 902a and a second layer 902b. Said di-electric shield 904 is configured between said first layer 902a and said second layer 902b. Wherein, power components among said suppression elements 510 are embedded into said first layer 902a and neutral or common components among said suppression elements 510 are located on said second layer 902b.

Said one or more varistors 608 comprise zinc-oxide nonlinear resistors.

Said suppression elements 510 are configured for sinewave correction to filter and protect equipment.

Said adapter system 100 further comprises a PCB 512 configured to monitor a status of said power line connectors 502 and to protect said adapter system 100, equipment attached thereto, and to activate an indicator 506.

Said adapter system 100 comprises an enclosure 102, a power line connectors 502 and a suppression elements 510. A plug sockets 104 comprise at least a first line socket 302 and a neutral socket 304. Said first line socket 302 connects to a first line 312. Said neutral socket 304 connects to a neutral 316. Said adapter system 100 is configured to connect to at least said first line 312 with said power line connectors 502 and suppressing a portion of a power on said first line 312 with said suppression elements 510. Said suppression elements 510 comprises one or more PCB headers 602 having one or more header connectors 604, one or more fuses 606, one or more varistors 608, one or more resistors 610, one or more diodes 612, one or more capacitors 614, an inductor 618a, one or more switches 620, a K1 622, one or more buses 628. A portion of said suppression elements 510 comprise a monitoring circuit. Said monitoring circuit is protected from other portions of said suppression elements 510 with a diode bridge. Said one or more PCB headers 602 comprise a first PCB header 602a. Said first PCB header 602a comprises a first header connector 604a, a second header connector 604b, and a third header connector 604c. Said first PCB header 602a comprises a first fuse 606a between to said first header connector 604a and a first suppression bus 628a. The following components are arranged in parallel between a second suppression bus 628b and a third suppression bus 628c: a second resistor 610b, a second varistor 608b, a second diode 612b and a second capacitor 614b. The following components are arranged in parallel between said third suppression bus 628c and said second suppression bus 628b: a first resistor 610a, a first varistor 608a, a first diode 612a and a first capacitor 614a. Said second header connector 604b attaches directly to said second suppression bus 628b. A second fuse 606b connects between said third header connector 604c and said third suppression bus 628c. The following components are arranged in series between said third suppression bus 628c and a first terminal 616a of a diode bridge 612c: a third resistor 610c and a third capacitor 614c. A second terminal 616b connects to a second monitoring bus 628e. A fourth terminal 616d connects to a first monitoring bus 628d. A third terminal 616c connects to said first suppression bus 628a. The following components are arranged in parallel between said second monitoring bus 628e and said first monitoring bus 628d: a fourth capacitor 614d, a fourth diode 612d, a fourth resistor 610d and said inductor 618a. Said fourth header connector 604d connects to the output of a first switch 620a. A sixth header connector 604f and a fifth header connector 604e connect to the inputs of said first switch 620a. An output of a second switch 620b is connected to said second monitoring bus 628e. The following components can be arranged in series between said first monitoring bus 628d and a first input of said second switch 620b: a fifth diode 612e and a fifth resistor 610e. Said K1 622 is attached to the second input of said second switch 620b. An adapter system 100 for protection of electronics from voltage spikes induced on connected wires.

Said adapter system 100 comprises an enclosure 102, a power line connectors 502 and a suppression elements 510. A plug sockets 104 comprise at least a first line socket 302 and a neutral socket 304. Said first line socket 302 connects to a first line 312. Said neutral socket 304 connects to a neutral 316. Said adapter system 100 is configured to connect to at least said first line 312 with said power line connectors 502 and suppressing a portion of a power on said first line 312 with said suppression elements 510. Said suppression elements 510 comprise one or more PCB headers 602 having one or more header connectors 604, one or more fuses 606, one or more varistors 608, one or more resistors 610, one or more diodes 612, one or more capacitors 614, an inductor 618a, a K1 622, isolated contact form C 624 and one or more buses 628. Said one or more buses 628 comprise a first suppression bus 628a, a second suppression bus 628b, a third suppression bus 628c, and a first monitoring bus 628d. A portion of said suppression elements 510 comprise a monitoring circuit. Said monitoring circuit is protected from other portions of said suppression elements 510 with a diode bridge. Said one or more PCB headers 602 comprise a first PCB header 602a and a second PCB header 602b. Said first PCB header 602a comprises a first header connector 604a, and a third header connector 604c. A first fuse 606a attaches between to said first header connector 604a and said first suppression bus 628a. The following components are arranged in parallel between said second suppression bus 628b and said first suppression bus 628a: a first resistor 610a, a first varistor 608a, a first diode 612a, a second diode 612b and a first capacitor 614a. A second fuse 606b connects between said third header connector 604c and said second suppression bus 628b. Said one or more diodes 612 comprise a diode bridge 612c. Said diode bridge 612c comprises a diode bridge comprising a first terminal 616a, a second terminal 616b, a third terminal 616c, and a fourth terminal 616d. Said diode bridge 612c is arranged between a portion of said suppression elements 510 and a monitoring circuit protection configuration 630 to protect monitoring components within said suppression elements 510. The following components are arranged in series between said second suppression bus 628b and said first terminal 616a of said diode bridge 612c: a third resistor 610c and a third capacitor 614c. Said second terminal 616b connects to a second monitoring bus 628e. Said fourth terminal 616d connects to said first monitoring bus 628d. Said third terminal 616c connects to said first suppression bus 628a. The following components are arranged in parallel between said second monitoring bus 628e and said first monitoring bus 628d: a fourth capacitor 614d, a fourth diode 612d, a fourth resistor 610d, said inductor 618a and the combination of a sixth resistor 610f and a fifth diode 612e in series. Said isolated contact form C 624 comprises said second PCB header 602b with a first switch 620a and a second switch 620b. Said second PCB header 602b comprises a fourth header connector 604d, a fifth header connector 604e and a sixth header connector 604f. Said fourth header connector 604d connects to the output of said first switch 620a. Said sixth header connector 604f and said fifth header connector 604e connect to the inputs of said first switch 620a. An output of said second switch 620b is connected to said second monitoring bus 628e. Said K1 622 is attached to the second input of said second switch 620b. Said one or more varistors 608 comprise zinc-oxide nonlinear resistors.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An adapter system for protection of electronics from voltage spikes induced on connected wires, wherein:
   said adapter system comprises an enclosure, two or more plug sockets comprising one or more power line connectors and suppression elements;
   said two or more plug sockets comprise at least a first line socket and a neutral socket;
   said first line socket is configured to connect to a first line comprising a power line;
   said neutral socket is configured to connect to a neutral line;
   said adapter system is configured to connect to at least said first line with said one or more power line connectors and suppressing a portion of a power on said first line with said suppression elements;
   said suppression elements comprise one or more PCB headers each having one or more header connectors, one or more fuses, one or more varistors, one or more resistors, one or more diodes, one or more capacitors, an inductor, isolated form C contacts comprising one or more switches, and one or more buses;
   said one or more buses comprise a first suppression bus, and a second suppression bus;
   a portion of said suppression elements comprises a monitoring circuit;
   said monitoring circuit is protected from other portions of said suppression elements with a diode bridge;
   said one or more PCB headers comprise a first PCB header and a second PCB header;
   said first PCB header comprises a first header connector, and a third header connector;
   a first fuse attaches between said first header connector and said first suppression bus;
   the following components are arranged in parallel between said second suppression bus and said first suppression bus: a first resistor, a first varistor, a first diode, a second diode and a first capacitor;
   a second fuse connects between said third header connector and said second suppression bus;
   said diode bridge comprises a first terminal, a second terminal, a third terminal, and a fourth terminal;
   said diode bridge is arranged between a portion of said suppression elements and a monitoring circuit protection configuration to protect monitoring components within said suppression elements;
   the following components are arranged in series between said second suppression bus and said first terminal of said diode bridge: a third resistor and a third capacitor;
   said one or more buses further comprise a first monitoring bus, and a second monitoring bus;
   said second terminal connects to said second monitoring bus;
   said fourth terminal of said diode bridge connects to said first monitoring bus;
   said third terminal of said diode bridge of said diode bridge connects to said first suppression bus;
   the following components are arranged in parallel between said first monitoring bus and said second monitoring bus: a fourth capacitor, a fourth diode, a fourth resistor, said inductor and the combination of a sixth resistor and a fifth diode in series;
   said isolated form C contacts comprising said second PCB header with a first switch; and
   said second PCB header comprises a fourth header connector, a fifth header connector and a sixth header connector;
   said fourth header connector connects to the output of said first switch; and
   said sixth head connector and said fifth head connector connect to the inputs of said first switch.

2. The adapter system from claim 1, wherein:
   said adapter system comprises a multi-layer circuit board embedded with portions of said suppression elements and a PCB;
   said multi-layer circuit board comprises a di-electric shield, a first layer and a second layer;
   said di-electric shield is configured between said first layer and said second layer; and
   wherein,
      power components among said suppression elements are embedded into said first layer and
      neutral or common components among said suppression elements are located on said second layer.

3. The adapter system from claim 1, wherein:
   said one or more varistors comprise zinc-oxide nonlinear resistors.

4. The adapter system from claim 1, wherein:
   if said adapter system fails, equipment attached to said adapter system can simply shut down rather than have a voltage spike; and
   said suppression elements is configured to protect a PCB.

5. The adapter system from claim 1, wherein:
   said adapter system is arranged in a single phase configuration;
   said single phase configuration comprises
      said first line attached to a portion of said two or more plug sockets and
      said neutral socket attached to said neutral.

6. The adapter system from claim 1, wherein:
   said adapter system further comprises an indicator comprising an LED light; and
   said indicator is configured to indicate a status of said adapter system.

7. The adapter system from claim 1, wherein:
   said adapter system comprises safety fusing and non-ground dependent design; and
   said enclosure comprises a nonconductive, corrosion resistant material.

8. The adapter system from claim 1, wherein:
   said two or more plug sockets further comprise a second two or more plug sockets; and
   said second two or more plug sockets is configured to communicate a status of said adapter system to other systems, such as monitoring systems.

9. The adapter system from claim 8, wherein:
   said second two or more plug sockets comprise a common alarm socket, a normally closed alarm socket and a normally open alarm socket.

10. The adapter system from claim 1, wherein:
said enclosure is configured to protect and enclose said suppression elements.

11. The adapter system from claim 1, wherein:
said suppression elements are configured for sinewave correction to filter and protect equipment.

12. The adapter system from claim 1, wherein:
said adapter system further comprises a PCB configured to monitor a status of said one or more power line connectors and to protect said adapter system and equipment attached thereto, and to activate an indicator.

13. The adapter system from claim 1, wherein:
said suppression elements wherein said form C contacts further comprise a second switch.

14. An adapter system for protection of electronics from voltage spikes induced on connected wires, wherein:
said adapter system comprises an enclosure, two or more plug sockets comprising one or more power line connectors and suppression elements;
said two or more plug sockets comprise at least a first line socket and a neutral socket;
said first line socket is configured to connect to a first line comprising a power line;
said neutral socket is configured to connect to a neutral line;
said adapter system is configured to connect to at least said first line with said one or more power line connectors and suppressing a portion of a power on said first line with said suppression elements;
said suppression elements comprise one or more PCB headers each having one or more header connectors, one or more fuses, one or more varistors, one or more resistors, one or more diodes, one or more capacitors, an inductor, one or more switches, and one or more buses;
a portion of said suppression elements comprises a monitoring circuit;
said monitoring circuit is protected from other portions of said suppression elements with a diode bridge;
said one or more PCB headers comprise a first PCB header;
said first PCB header comprises a first header connector, a second header connector, and a third header connector;
said first PCB header comprises a first fuse between said first header connector and a first suppression bus;
the following components are arranged in parallel between a second suppression bus and said first suppression bus: a second resistor, a second varistor, a second diode and a second capacitor;
the following components are arranged in parallel between a third suppression bus and said second suppression bus: a first resistor, a first varistor, a first diode and a first capacitor;
said second header connector attaches directly to said second suppression bus;
a second fuse connects between said third header connector and said third suppression bus;
the following components are arranged in series between said third suppression bus and a first terminal of said diode bridge: a third resistor and a third capacitor;
said one or more buses further comprise a first monitoring bus, and a second monitoring bus;
a second terminal of said diode bridge connects to said second monitoring bus;
a fourth terminal of said diode bridge connects to said first monitoring bus;
a third terminal of said diode bridge connects to said first suppression bus;
the following components are arranged in parallel between said first monitoring bus and said second monitoring bus: a fourth capacitor, a fourth diode, a fourth resistor and said inductor;
said suppression elements further comprises a first switch;
a fourth header connector of a second PCB header connects to the output of said first switch; and
a sixth header connector and a fifth header connector of the second PCB header connect to the inputs of said first switch.

15. The adapter system from claim 14, wherein:
an output of a second switch is connected to said second monitoring bus; and
the following components can be arranged in series between said first monitoring bus and a first input of said second switch: a fifth diode and a fifth resistor.

16. An adapter system for protection of electronics from voltage spikes induced on connected wires, wherein:
said adapter system comprises an enclosure, two or more plug sockets comprising one or more power line connectors and suppression elements;
said two or more plug sockets comprise at least a first line socket and a neutral socket;
said first line socket is configured to connect to a first line comprising a power line;
said neutral socket is configured to connect to a neutral line;
said adapter system is configured to connect to at least said first line with said one or more power line connectors and suppressing a portion of a power on said first line with said suppression elements;
said suppression elements comprise one or more PCB headers each having one or more header connectors, one or more fuses, one or more varistors, one or more resistors, one or more diodes, one or more capacitors, an inductor, one or more switches, one or more buses;
a portion of said suppression elements comprises a monitoring circuit;
said monitoring circuit is protected from other portions of said suppression elements with a diode bridge;
said one or more PCB headers comprise a first PCB header;
said first PCB header comprises a first header connector, a second header connector, and a third header connector;
said first PCB header comprises a first fuse between to said first header connector and a first suppression bus;
the following components are arranged in parallel between a second suppression bus and said first suppression bus: a second resistor, a second varistor, a second diode and a second capacitor;
the following components are arranged in parallel between a third suppression bus and said second suppression bus: a first resistor, a first varistor, a first diode and a first capacitor;
said second header connector attaches directly to said second suppression bus;
a second fuse connects between said third header connector and said third suppression bus;
the following components are arranged in series between said third suppression bus and a first terminal of said diode bridge: a third resistor and a third capacitor;
a second terminal of said diode bridge connects to a second monitoring bus;

a fourth terminal of said diode bridge connects to a first monitoring bus;

a third terminal of said diode bridge connects to said first suppression bus;

the following components are arranged in parallel between said second monitoring bus and said first monitoring bus: a fourth capacitor, a fourth diode, a fourth resistor and said inductor;

a fourth header connector of a second PCB header connects to the output of a first switch;

a sixth header connector and a fifth header connector of the second PCB header connect to the inputs of said first switch;

an output of a second switch is connected to said second monitoring bus; and the following components can be arranged in series between said first monitoring bus and a first input of said second switch: a fifth diode and a fifth resistor.

17. The adapter system from claim 16, wherein:

said adapter system comprises a multi-layer circuit board embedded with portions of said suppression elements and a PCB;

said multi-layer circuit board comprises a di-electric shield, a first layer and a second layer;

said di-electric shield is configured between said first layer and said second layer; and wherein,
   power components among said suppression elements are embedded into said first layer and
   neutral or common components among said suppression elements are located on said second layer.

18. The adapter system from claim 16, wherein:

said one or more varistors comprise zinc-oxide nonlinear resistors.

* * * * *